US010985837B2

(12) United States Patent
Ibach et al.

(10) Patent No.: US 10,985,837 B2
(45) Date of Patent: Apr. 20, 2021

(54) GENERIC NON-CLIENT SPECIFIC PROTECTION VIA TCM STATUS AND ENHANCED OTN NETWORK PROPAGATION OF CLIENT FAULTS

(71) Applicant: Ciena Corporation, Hanover, MD (US)

(72) Inventors: Trevor John Ibach, Manotick (CA); Larry Babineau, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/442,669

(22) Filed: Jun. 17, 2019

(65) Prior Publication Data

US 2020/0396001 A1 Dec. 17, 2020

(51) Int. Cl.
*H04B 10/032* (2013.01)
*H04B 10/079* (2013.01)
*H04B 10/27* (2013.01)

(52) U.S. Cl.
CPC ..... *H04B 10/032* (2013.01); *H04B 10/07951* (2013.01); *H04B 10/27* (2013.01)

(58) Field of Classification Search
CPC .... H04J 2203/006; H04J 3/14; H04J 14/0227; H04J 3/1652; H04J 2203/0085; H04J 3/1611; H04J 14/0268; H04J 14/0273; H04J 2203/0028; H04Q 11/0062; H04Q 2011/0079; H04Q 2011/0081; H04L 45/28; H04B 10/032; H04B 10/27; H04B 10/07951
USPC ...................................................... 398/1–38
See application file for complete search history.

(56) References Cited

U.S. PATENT DOCUMENTS

| 7,143,161 | B2 | 11/2006 | Brissette |
| 7,257,117 | B2 | 8/2007 | Roberts et al. |
| 7,590,051 | B1 * | 9/2009 | Skalecki ............. H04L 41/0668 370/218 |
| 7,602,814 | B2 | 10/2009 | Meagher et al. |
| 7,792,044 | B2 | 9/2010 | Holness et al. |
| 7,969,868 | B2 | 6/2011 | Liou et al. |
| 8,417,111 | B2 * | 4/2013 | Moynihan ............. H04J 3/1652 398/1 |
| 9,088,380 | B2 | 7/2015 | Ibach et al. |
| 9,479,248 | B2 * | 10/2016 | Surek .................. H04Q 11/0066 |
| 9,628,172 | B2 * | 4/2017 | Prakash ............... H04B 10/032 |

(Continued)

OTHER PUBLICATIONS

Littlewood et al; Experts guide to Optical transport Networks: The Utilities Edition; 2015; pp. 1-46. (Year: 2015).*

(Continued)

*Primary Examiner* — Amritbir K Sandhu
(74) *Attorney, Agent, or Firm* — Clements Bernard Walker; Lawrence A. Baratta, Jr.; Christopher L. Bernard

(57) ABSTRACT

A network element includes a client port configured to receive a signal for transmission; a line port configured to transmit the signal to a far end via Optical Transport Network (OTN); circuitry configured to communicate one or more of a fault and a status associated with the signal to the far end via OTN overhead. The circuitry configured to communicate can be for the fault and utilizes one or more Tandem Connection Monitoring (TCM) layers in the OTN overhead. The circuitry configured to communicate can be for the status and utilizes one or more of Optical Data Unit (ODU) Performance Monitoring (PM) and one or more Tandem Connection Monitoring (TCM) layers.

16 Claims, 7 Drawing Sheets

(56) References Cited

U.S. PATENT DOCUMENTS

| | | | |
|---|---|---|---|
| 9,680,588 B2 * | 6/2017 | Connolly | H04L 41/0803 |
| 9,800,361 B2 * | 10/2017 | Gareau | H04L 25/49 |
| 9,806,801 B2 * | 10/2017 | Maniloff | H04B 10/0791 |
| 9,853,722 B1 * | 12/2017 | Sharma | H04J 3/14 |
| 10,341,258 B2 * | 7/2019 | Sareen | H04B 10/032 |
| 10,587,339 B1 * | 3/2020 | Al Sayeed | H04B 10/70 |
| 10,594,395 B2 * | 3/2020 | Abdullah | H04L 7/0075 |
| 2003/0123493 A1 | 7/2003 | Takahashi | |
| 2004/0114924 A1 | 6/2004 | Holness et al. | |
| 2008/0089693 A1 | 4/2008 | El-Ahmadi et al. | |
| 2008/0199183 A1 | 8/2008 | Liu et al. | |
| 2008/0279553 A1 | 11/2008 | Meagher et al. | |
| 2009/0161681 A1 | 6/2009 | Madrahalli et al. | |
| 2009/0232492 A1 | 9/2009 | Blair et al. | |
| 2010/0014857 A1 | 1/2010 | Haas | |
| 2010/0054731 A1 | 3/2010 | Oltman et al. | |
| 2010/0272438 A1 | 10/2010 | Conklin et al. | |
| 2011/0013911 A1 | 1/2011 | Alexander et al. | |
| 2011/0103222 A1 * | 5/2011 | Mutoh | H04L 12/437 370/228 |
| 2011/0135312 A1 * | 6/2011 | El-Ahmadi | H04L 1/0057 398/135 |
| 2011/0170859 A1 | 7/2011 | Conklin et al. | |
| 2011/0170860 A1 | 7/2011 | Smith et al. | |
| 2011/0262128 A1 | 10/2011 | Madrahalli et al. | |
| 2011/0274427 A1 | 11/2011 | Madrahalli et al. | |
| 2012/0269511 A1 | 10/2012 | Calderon et al. | |
| 2013/0114953 A1 * | 5/2013 | Moynihan | H04B 10/032 398/5 |
| 2013/0177309 A1 * | 7/2013 | El-Ahmadi | H04L 1/0057 398/25 |
| 2013/0322867 A1 * | 12/2013 | Ibach | H04J 3/1652 398/2 |
| 2014/0186019 A1 * | 7/2014 | Chaudhary | H04B 10/032 398/1 |
| 2016/0006502 A1 * | 1/2016 | Fulignoli | H04J 3/14 398/2 |
| 2017/0366255 A1 * | 12/2017 | Sharma | H04Q 11/0005 |
| 2018/0041280 A1 * | 2/2018 | Elahmadi | H04L 1/0045 |
| 2019/0045282 A1 * | 2/2019 | Yin | H04B 10/0795 |

OTHER PUBLICATIONS

International Telecommunication Union, ITU-T G.709/Y.1331, Telecommunication Standardization Sector of ITU, Interfaces for the optical transport network, Jun. 2016, pp. 1-244.

International Telecommunication Union, ITU-T G.798, Telecommunication Standardization Sector of ITU, Characteristics of optical transport network hierarchy equipment functional blocks, Jun. 2017, pp. 1-390.

* cited by examiner

GENERIC NON-CLIENT SPECIFIC PROTECTION VIA TCM STATUS AND ENHANCED OTN NETWORK PROPAGATION OF CLIENT FAULTS

FIELD OF THE DISCLOSURE

The present disclosure generally relates to networking, namely Optical Transport Network (OTN). More particularly, the present disclosure relates to systems and methods for generic non-client specific protection via Tandem Connection Monitoring (TCM) status and enhanced OTN network propagation of client faults.

BACKGROUND OF THE DISCLOSURE

OTN is defined in, for example, ITU-T Recommendation G.709 (June/2016) "Interfaces for the Optical Transport Network (OTN)," ITU-T Recommendation G.798 (December/2017) "Characteristics of optical transport network hierarchy equipment functional blocks," etc., the contents of which are incorporated by reference herein. OTN networks and standards employ line and path level protection but may require additional non-standard capabilities for physical layer protection. Optical Data Unit (ODU) and TCM path status typically reflects the status between the origination and termination points of the ODU and TCM path, whereas physical layer protection requires the client status prior to the origination of the path to be communicated to the far end. OTN standards-compliant equipment will communicate client faults to the far end only via an Optical Path Unit (OPU) Client Signal Fail (CSF) indication in the OPU overhead and a replacement signal within the OPU payload.

Providing signal conditioning at the ODU path layer, as in commonly-assigned U.S. Pat. No. 9,088,380, issued Jul. 21, 2015, and entitled "Optical transport network generic non-client specific protection systems and methods," the contents of which are incorporated by reference, allows additional benefits by escalating these client faults to ODU path layer faults so that the far end protection scheme only needs ODU path visibility in order to protect against near end client faults, which is typical in Sub-Network Connection with Non-intrusive end-to-end monitoring (SNC/Ne) protection schemes using standard OTN equipment. The standards-based solution of communicating client faults via the OPU CSF indication and a replacement signal means that the far end protection scheme needs to terminate the ODU path and OPU layers for each path independently before performing the protection switch. OTN equipment will typically only have this capability after the protected connection function, which is too late for protection purposes.

OPU and payload-based solutions also do not provide any protection signaling capability, as there is no Automatic Protection Switching (APS) channel available at those layers. U.S. Pat. No. 9,088,380 solved this problem by using an ODU path status to communicate the client fault to far end nodes for protection. This enables any subsequent node to use the ODU path status for path protection. But it still means that there is only a single mechanism for communicating the local failures to the far end. Cascaded ODU Path protection schemes could be employed, but they would all be using the same ODU Path status which does not provide the flexibility of TCMs.

Also, OTN networks currently provide the ability to propagate the CSF status across a network within the OPU overhead via the OPU CSF (Client Signal Fail) status bit. Because the client signal is failed, it usually is accompanied by a replacement signal within the payload of the OPU. This CSF status only exists within the OPU overhead, not within TCM Overhead. OPU overhead is generally not visible unless the ODU Performance Monitoring (PM) layer is terminated. The OPU CSF functionality only applies for a failed client signal, not for a degraded client signal. Degraded signals are transported silently and transparently through an OTN network. A degraded signal may be detected at the point where the client is extracted from the OPU payload if the errors are present at that point in the network, but not if the errors are Forward Error Correction (FEC) corrected at the client ingress point in the network.

Client Admin Down states and Equipment Failed states are not explicitly communicated across an OTN network and have no direct ability to trigger a far end protection switch or raise an alarm for the specific Admin Down or Equipment Failed state. These states can overload an existing status or utilize a replacement signal/Alarm Indication Signal (AIS) insertion if action/alarms are desired at the far end. Other typical solutions involve traffic conditioning to the far end which does have the ability to provide protection and alarming capabilities at any point along the ODU path.

The primary purpose of having a CSF alarmable defect at the far end of the network is because it is a demarcation point to indicate that the fault was upon entry into the network and not introduced within the network itself. With the current known solutions, there is no means to provide a far-end notification such as a defect for degraded client signals, degraded physical signals which may be preludes to a failed signal, or explicitly for states such as Client Admin Down or Equipment Failed.

Conventional solutions employ a CSF status only within the OPU overhead. The OPU overhead is typically only visible at the point where the ODU PM layer has been terminated, and the client signal is being extracted. Thus, any such client defect which has a status within the OPU overhead is not available at the following network locations: at the input to an SNC/Ne protected connection; at OTN handoff points between network operators; and at any locations using TCMs for status, such as Sub-Network Connection with Non-intrusive sublayer monitoring (SNC/Ns) or Sub-Network Connection with Sub-layer monitoring (SNC/S) protected connections.

When the near end (which has the client fault) offers physical layer protection, such as Y-cable protection (Y-cable protection is a network-side protection scheme that protects an interface with a splitter and combiner), it may be desirable to trigger a protection switch at the far end in order to maintain error-free traffic. Conventional solutions do not provide a mechanism to trigger that far end protection switch for these client statuses, particularly in unidirectional protection applications which do not use APS byte signaling.

Using traffic conditioning to signal faults to the far end will squelch client traffic which may not be desirable in some fault scenarios. For example, the nature of an equipment failure may not affect the ability to carry this client service, but the network operator may still wish to switch traffic away from the path with the failed equipment if possible. Or the degraded physical signal may not impact traffic, perhaps because client FEC is correcting all errors, but because it may signify a degrading cable, a protection switch away from that client may be desirable.

If the client is an OTN client, it may be possible that there are bit errors at the Optical Transport Unit (OTU) layer which are not present at the ODU layer, but because the OTU layer is terminated, it is not possible to signal this degrade defect to the far-end.

BRIEF SUMMARY OF THE DISCLOSURE

In an embodiment, a network element includes a client port configured to receive a signal for transmission; a line port configured to transmit the signal to a far end via Optical Transport Network (OTN); circuitry configured to communicate one or more of a fault and a status associated with the signal to the far end via OTN overhead. The circuitry configured to communicate can be for the fault and can utilize one or more Tandem Connection Monitoring (TCM) layers in the OTN overhead. The one or more TCM layers can contain a pattern based on a failure of the signal. The one or more TCM layers can be a plurality of TCM layers for monitoring of the signal at multiple points in a network. The signal can be an OTN signal utilizing a first set of one or more of the TCM layers, and wherein a second set of one or more TCM layers for the fault are utilized different from the first set. The one or more TCM layers can have an Alarm Indication Signal (AIS) inserted therein responsive to the fault.

The circuitry configured to communicate can be for the status and utilizes one or more of Optical Data Unit (ODU) Performance Monitoring (PM) and one or more Tandem Connection Monitoring (TCM) layers. The status can be in one or more unused bytes in the OTN overhead with each position in the unused byte utilized to convey a different status. The status can be one or more of degraded physical signal, client admin down, equipment fail, client signal fail, and client signal degrade. The network element can further include physical protection between the client port and associated client equipment, wherein the physical protection splits the signal into two signals which are transported over the line port and a second line port. The far end can be configured to select the two signals from the line port and the second line port based on one or more of the status and the fault.

In another embodiment, a network includes a network element A; a network element Z; and a plurality of network elements interconnecting the network element A and the network element Z; wherein a client service is configured between the network element A and the network element Z on two different paths and using Optical Transport Network (OTN), wherein the network element A utilizes OTN overhead to communicate one or more of i) a fault associated with the client service and ii) a status of the client service on any of the two different paths, and wherein the network element Z utilizes any of the fault and the status to select one of the two different paths. The fault can be communicated via one or more Tandem Connection Monitoring (TCM) layers in the OTN overhead. The status can be communicated via one or more of i) Optical Data Unit (ODU) Performance Monitoring (PM) and ii) one or more Tandem Connection Monitoring (TCM) layers.

In a further embodiment, a method includes, in a network element, receiving a signal for transmission; communicating one or more of i) a fault associated with the signal and ii) a status of the signal to a far end via Optical Transport Network (OTN) overhead; and transmitting the signal to the far end via OTN with the fault and the status in the OTN overhead. The communicating the fault can utilize one or more Tandem Connection Monitoring (TCM) layers in the OTN overhead. The one or more TCM layers can have an Alarm Indication Signal (AIS) inserted therein responsive to the fault. The one or more TCM layers can be a plurality of TCM layers for monitoring of the signal at multiple points in a network. The communicating the status can utilize one or more of i) Optical Data Unit (ODU) Performance Monitoring (PM) and ii) one or more Tandem Connection Monitoring (TCM) layers. The method can further include physical protecting the signal prior to the receiving, wherein the physical protecting splits the signal into two signals which are transported over two line ports of the network element each with its status and fault in the OTN overhead.

BRIEF DESCRIPTION OF THE DRAWINGS

The present disclosure is illustrated and described herein with reference to the various drawings, in which like reference numbers are used to denote like system components/method steps, as appropriate, and in which:

FIG. 7 is a block diagram of a processing device for the network element of FIG. 6 or the like.

DETAILED DESCRIPTION OF THE DISCLOSURE

Figure 1:
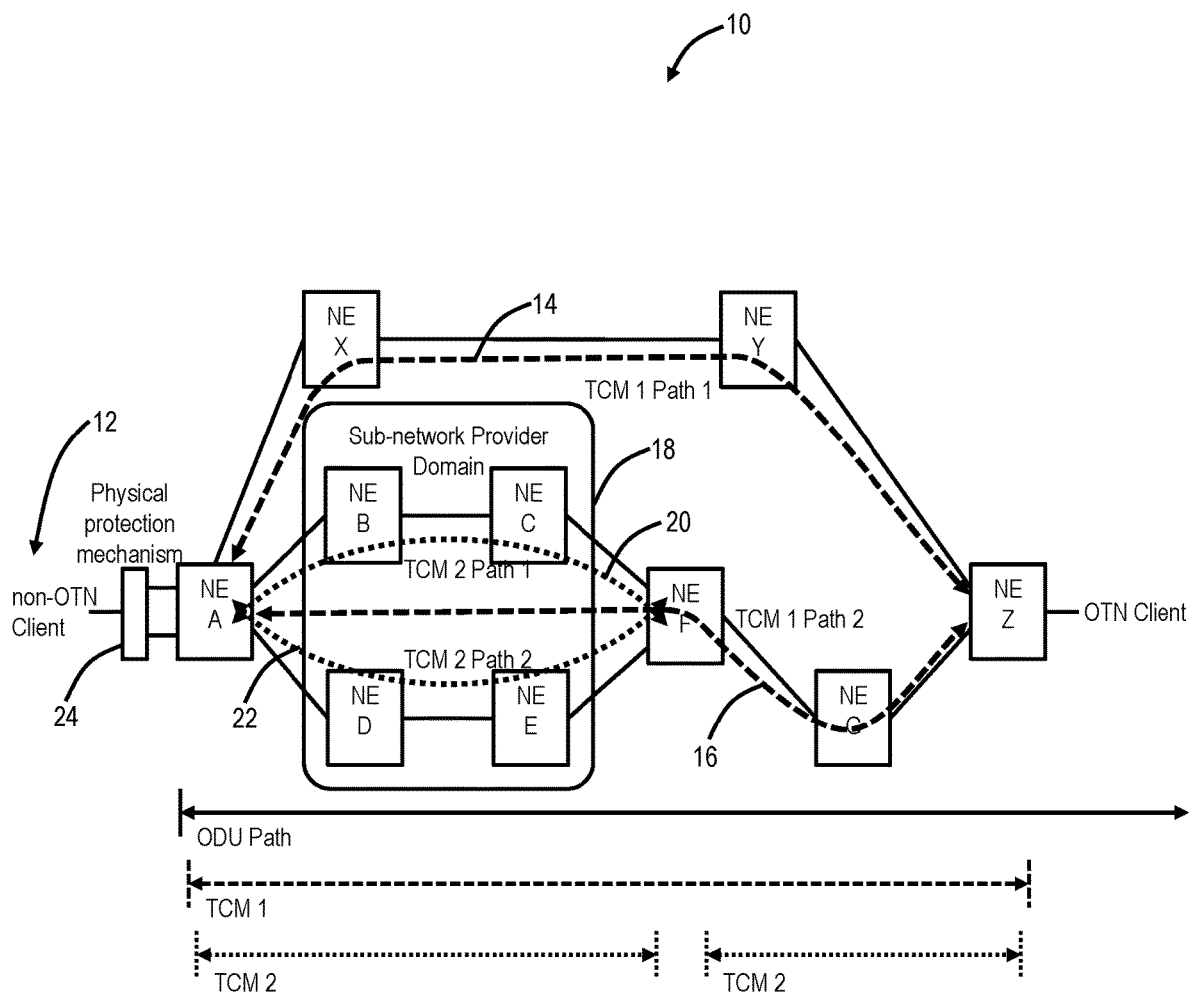
FIG. 1 is a network diagram of a network that provides a non-OTN service between a network element NE A and a network element NE Z via diverse paths including over a sub-network provider domain.

The present disclosure relates to systems and methods for generic non-client specific protection via Tandem Connection Monitoring (TCM) status and enhanced OTN network propagation of client faults. In an embodiment, the present disclosure uses status at a TCM layer to communicate the faults to the far end for triggering a far end protection switch. The TCM layer can be any of TCM1 to TCM6 for the ODU path and can even be communicated in multiple TCM layers simultaneously to allow for far end visibility at multiple points throughout the network. This allows protection to be closed at earlier locations within the provider's network if they so choose. A TCM could be enabled for only a portion of the network, and if protection is closed and the TCM terminated, then subsequent nodes would not experience the failed TCM status. In another embodiment, the present disclosure enhances the ability to propagate client status to the far end, at any, or several, of the ODU Performance Monitoring (PM) or TCM layers within the OTN overhead.

Protection Via TCM Status

Again, the present disclosure proposes the use of status at a TCM layer in OTN to communicate faults to a far end for triggering a far end protection switch. At the point where the client signal is mapped into an OTN payload, the TCM layer(s) being used must be identified and configured to insert traffic conditioning due to various triggers such as ingress client faults, client admin status changes, equipment faults, etc. When any of these traffic conditioning triggers occur, the configured TCM layers can insert an Alarm Indication Signal (AIS) (all ones) pattern into the TCM STAT bits in the ODU overhead.

At the far end of the protected path, the equipment can employ SNC/Ns or SNC/S protection criteria to perform a protection switch based exclusively on the TCM status. This far end protection scheme could be a physical layer protection scheme, such as Y-cable protection, or an ODU path switch. The physical layer protection could be an active optical coupler which simply requires a failed path to trigger the turning of its laser off towards the coupler, triggering an optical switch. It could also be a passive coupler which requires coordination between the two client ports such that both ports never have their laser on at the same time. Various configurations regarding the ingress client signal and mapping into OTN could apply, such as described in U.S. Pat. No. 9,088,380.

Because this disclosure is using TCM status, it allows for the near end and/or far end client signals to be OTN signals instead of a traditional client signal (e.g., Ethernet, SONET/SDH, FC, etc.). For those OTN signals, the ODU path should be transparently carried, and there may even be TCMs enabled along the path which is required to be transparent. With this disclosure, the user can select the TCM that is used for protection status while the ODU Path and any other externally used TCM layers will remain transparent.

Along with the traffic conditioning which enables the use of TCM status for protection, the TCM also has protection signaling capability via APS bytes in the overhead, so bi-direction protection schemes are possible in a manner compliant to SNC/S protection.

Traffic conditioning on individual TCMs is not a normal operation. Normal traffic conditioning is to overwrite the entire Optical Data Unit level k (ODUk) signal including all ODU overhead (which includes all TCM status), the OPU overhead, and OPU payload. Enabling a TCM within this ODU path then overwrites the selected TCM overhead bytes with valid TCM overhead, allowing the TCM to appear as not failed to the far end where the TCM is monitored/terminated.

This disclosure allows these enabled TCMs to also reflect the client fault status by containing a pattern which constitutes a failed TCM (e.g., AIS, Lock (LCK), Open Connection Indication (OCI), etc.) within the enabled TCM's overhead for the selected TCMs. Adding this behavior to TCMs allows for more flexibility in network protection architectures which can now protect any part of the OTN network, and possibly even multiple different sized spans with the appropriate use of holdoffs or guard timers to prevent sympathetic switches. Sympathetic switching is described in commonly-assigned U.S. Pat. No. 9,853,722, issued Dec. 26, 2017, and entitled "Systems and methods for path protection switching due to client protection switching," the contents of which are incorporated by reference herein. Specifically, with both path protection in OTN and client-side protection on the associated clients, there is a scenario where a client-side switch, such as due to a failure of a client module or a fault in the client network, can lead to the detection of an anomaly in OTN causing path protection undesirably. This can be referred to as a sympathetic switch in OTN when client-side APS switches.

FIG. 1 is a network diagram of a network 10 that provides a non-OTN service 12 between a network element NE A and a network element NE Z via diverse paths 14, 16 including over a sub-network provider domain 18. The network 10 includes network elements NE A, B, C, D, E, F, G, X, Y, Z. The network elements NE B, C, D, E are in the sub-network provider domain 18. The path 14 is between the network elements NE A, X, Y, Z. The path 16 is between the network element NE A, the sub-network provider domain 18, and the network elements NE F, G, Z. The sub-network provider domain 18 includes two additional diverse paths 20, 22 which form a portion of the path 16.

The non-OTN service 12 enters the provider's network 10 at the network element NE A, is mapped into OTN payloads and exits the network at the network element NE Z still contained within an OTN payload. The ODU Path thus begins at the network element NE A and continues after exiting the provider's network 10. The network elements NE B-E are contained within the sub-network provider domain 18, and this network provider wishes to use path protection on all services traversing that sub-network. The network provider also requires an end-to-end path protection scheme via the network elements NE X and Y. The network element NE A can employ a physical protection scheme 24 for the non-OTN service 12, so redundant copies enter the network element NE A and are mapped into the OTN payload.

The present disclosure utilizes TCMs, e.g., TCM1 and TCM2. By using multiple TCMs to convey client status to the far end, this allows the network provider to provide path protection as per the following:

TCM 2 can be used for closing SNC/S protection from NE A to NE F traversing the sub-network provider domain 18, with one path traversing NEs A-B-C-F and the other path traversing NEs A-D-E-F; and TCM 1 can be used for closing SNC/Ns or SNC/S protection from NE A to NE Z with one path traversing NEs A-X-Y-Z and the other path traversing NE A, the sub-network provider's domain 18, and NEs F-G-Z.

By instituting traffic conditioning per TCM, this enables any standard OTN equipment to use these TCM statuses for alarm or protection purposes throughout the network, which cannot be done with a standards-based solution.

This allows full SNC/S style protection with the TCM being used for protection status and signaling, which enables bi-directional protection schemes for physical layer and path layer protection.

Because there are multiple TCMs per ODU path and this traffic conditioning can occur at multiple TCM levels simultaneously this allows the network providers to implement traffic protection schemes at any point, or even multiple points, within their network with appropriate TCM segmentation.

OTN Network Propagation of Client Faults

Currently, the only client status that is directly propagated across an OTN network is an ingress failed client signal, propagated as Client Signal Fail (CSF) within the OPU overhead. This disclosure provides an enhanced mechanism to communicate the following explicit client statuses throughout an OTN network, via ODUk PM or TCM status, such as Client Signal Degrade, Client Signal Fail, Client equipment Fail, Client Admin State is Down, Degraded Physical Signal, etc.

These status indications can be used to raise an alarmable defect or trigger a protection switch at any point within the network where the ODU PM or TCM status is available. The alarm and protection switch does not need the ability to either terminate the ODU or snoop within the OPU OH to determine the CSF status. By having these status indications available within any combinations of the ODU PM layer and the TCM layers, the above mentioned alarmable defect and protection switch triggers could be supported at any network location, not just where the ODU is terminated, and the client signal is visible. Because additional overhead is being used for this purpose, it is possible to maintain any existing client traffic if the fault status does not necessitate that a replacement signal needs to be instituted.

This disclosure provides an enhanced ability to propagate client status to the far end of the network. This propagation can take place at any, or several, of the ODU PM or TCM layers within the OTN overhead.

In an embodiment, the transport of the client status would consume one of the unused overhead bytes within the ODU PM layer, such as one of the RES (reserved) bytes. Multi-frame Alignment Signal (MFAS) alignment is used to identify which layer the status is communicated within. This allows the status to be transported at any, or several, of these layers simultaneously.

For example, one implementation of the MFAS overhead (OH) bits could be as follows:

| MFAS OH bits 6 7 8 | Client Status Layer |
|---|---|
| 0 0 0 | ODU PM |
| 0 0 1 | TCM 1 |
| 0 1 0 | TCM 2 |
| 0 1 1 | TCM 3 |
| 1 0 0 | TCM 4 |
| 1 0 1 | TCM 5 |
| 1 1 0 | TCM 6 |
| 1 1 1 | Unused |

Within the overhead byte(s) being employed for signaling, each bit can represent an individual client status which can be communicated to the far end. For example, this can define up to five different statuses that can be communicated, which leaves up to 3 bits for future use.

| Overhead bit | | | | | | | |
|---|---|---|---|---|---|---|---|
| 1 | 2 | 3 | 4 | 5 | 6 | 7 | 8 |
| Future | Future | Future | Degraded Physical Signal | Client Admin Down | Equipment Fail | Client Signal Fail | Client Signal Degrade |

Client Admin Down is where the administrative state of the client layer facility is Down. An appropriate replacement signal may or may not be inserted into the OPU payload, and the service may or may not be carried.

Equipment Fault is where supporting equipment for the client facility is failed and needs to be replaced. This may include a circuit pack, pluggable optics, etc. An appropriate replacement signal may or may not be inserted into the OPU payload, and service may or may not be carried.

Client Signal Fail is where the ingress client signal is failed. An appropriate replacement signal may or may not be inserted into the OPU payload.

Client Signal Degrade is where the ingress client signal is degraded; i.e., it contains uncorrected bit errors. An appropriate replacement signal may or may not be inserted into the OPU payload.

Degraded Physical Signal is where the ingress client physical signal is degraded, which does not manifest itself as errors within the digital layer, such as errors that are corrected by FEC, optical power out of specification, signal frequency out of specification. Here, 100% of traffic is maintained, so service is still carried. No replacement signal is inserted into the OPU payload.

In an embodiment, user controls could be available to allow any/all statuses to be turned on or off for any/all layers at which the status could be communicated. For example, the ODU PM layer may have all of Client Admin Down, Equipment Fail, Client Signal Fail, Client Signal Degrade and Degraded Physical Signal turned on, and TCM 1 may also be terminated and have only Client Signal Fail, and Client Admin Down status turned on. This means that at the far end of the ODU PM termination, all of those statuses would be available, but at the far end of the TCM 1 termination only the Client Signal Fail, and Client Admin Down statuses would be available.

Client status propagation can occur when a given ODU PM or TCM layer is terminated and operational at the point where the client signal enters the network. When the client status enters any of the previously mentioned states, the corresponding bit is set in the overhead for the layers that have that ability turned on.

Figure 2:
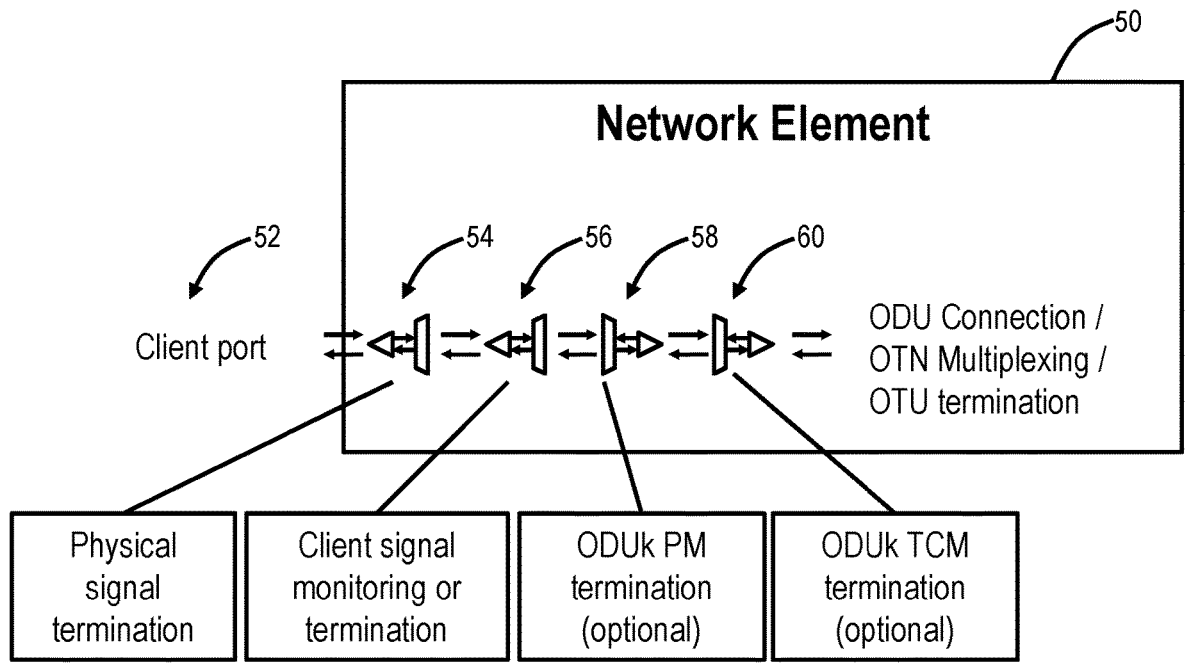
FIG. 2 is a block diagram of a network element illustrating examples of termination/monitoring points for various layers.

FIG. 2 is a block diagram of a network element 50 illustrating examples of termination/monitoring points for various layers. Specifically, FIG. 2 illustrates termination/monitoring points on a client port 52, at a physical signal termination 54, a client signal monitoring or termination 56, an ODUk PM termination 58, and an ODUk TCM termination 60. As described herein, the ODUk PM termination 58 and the ODUk TCM termination 60 are added for that client which would be used for signaling this client status to the far end.

If the client is a non-OTN client, then the ODUk PM layer is terminated at that client port 52, but if the client is an OTU client, then the ODUk PM layer would simply be monitored at best. In either case, an ODUk TCM layer could be terminated at that client port 52. This disclosure would allow these status bits in the ODU overhead to be asserted at either the ODU PM layer or ODUk TCM layer termination points for that client port 52.

Because additional overhead is being allocated for client status propagation, if the client signal cannot be transported, whether it is failed upon ingress to the equipment or the status has rendered the client signal unavailable, a suitable replacement signal can still be transported within the OPU payload to the far end. Additionally, the existing OPU CSF status for client signal fail can continue to function normally.

Because the client status is transported within the ODU overhead, it can be made available at any point along the ODU or TCM path for purposes such as alarming or triggering a protection switch. And because this is the ODU PM or TCM layer, the far-end protection type can be a Sub-Network Connection with Non-intrusive end-to-end monitoring (SNC/Ne), SNC/Ns or SNC/S path layer protection which has only ODU PM or TCM visibility.

At the far-end for the ODU PM layer or any TCM layer, this client status can be used for the purposes of raising a far-end client status alarm or triggering a protection switch to move traffic away from the client with the questionable/failed status. Because this client status is available at the ODU PM or TCM layers, the SNC/N protection is available at the far end.

Figure 3:
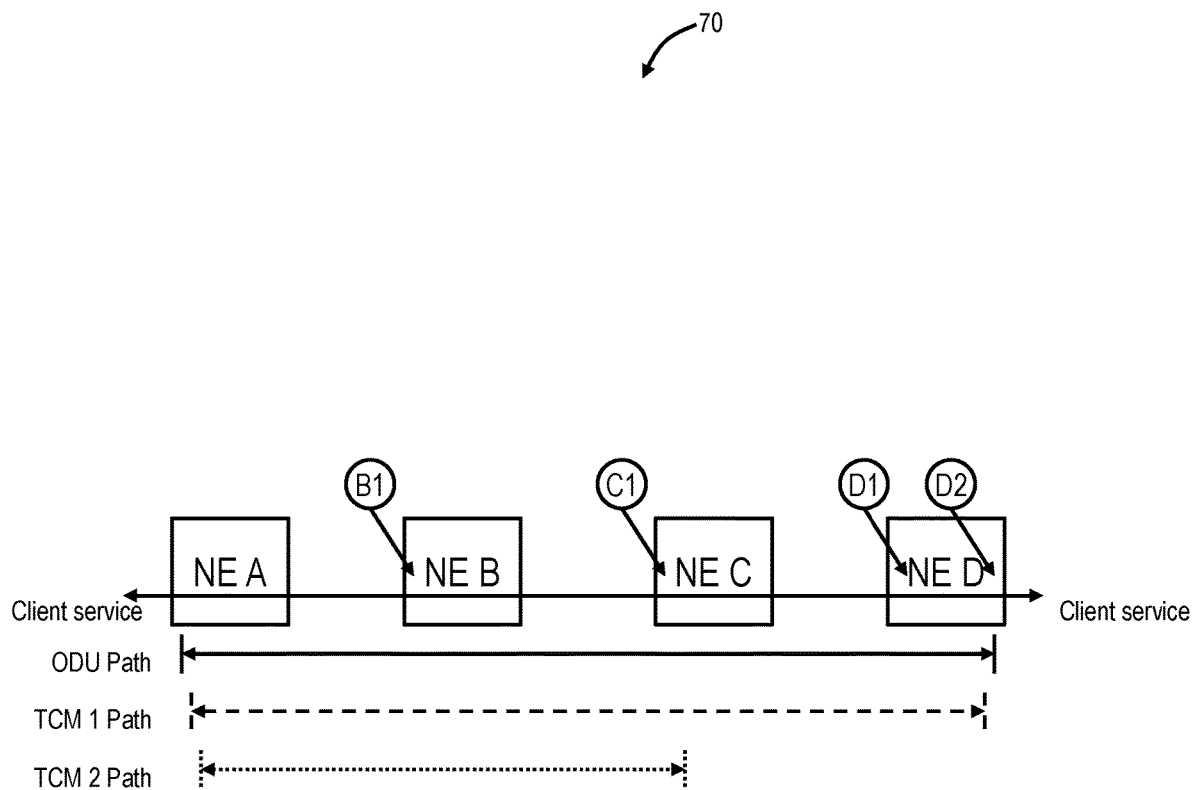
FIG. 3 is a network diagram of a network with network elements NE A, B, C, D illustrating a client service.

FIG. 3 is a network diagram of a network 70 with network elements NE A, B, C, D illustrating a client service 72. The client service 72 spans NEs A, B, C and D. The ODU Path originates at the client side of NE A, traverses NEs B and C, and terminates on the client side of NE D. TCM 1 is enabled and terminated on the client side of NE A and NE D. TCM 2 is enabled and terminated on the client side of NE A and on the line of NE C which is facing NE A. A client fault of any kind at NE A would assert this status for the ODU PM layer, TCM 1 and TCM 2 (assuming they all have the appropriate controls enabled). This status is then available for alarms/protection or other purposes at the following points throughout this sample network:

Point B1, at a non-intrusive monitor for the ODU PM, TCM 1 or TCM 2 layers

Point C1, at a non-intrusive monitor for the ODU PM or TCM 1 layers, or at a termination point for the TCM 2 layer Point D1, at a non-intrusive monitor for the ODU PM or TCM 1 layers Point D2, at a termination point for the ODU PM or TCM 1 layers At non-intrusive intermediate points, the status can be correlated to an alarm or trigger a protection switch but would continue through non-intrusively. At the far end where there ODU PM layer or the TCM is terminated, the status can also be correlated to an alarm or trigger a protection switch, and the status would be cleared for the given TCM or ODU PM layer.

The client status reflected in the ODU PM layer and TCM 1 would be transparent or optionally monitored, as it passes through points B1, C1, and D1, while being terminated at D2 where the entire ODU path terminates. The client status reflected in TCM 2 would be transparent, or optionally monitored, as it passes through point B1, but because TCM 2 terminates at point C1 no such status is passed to points D1 or D2 via TCM 2. At any point where the ODU PM or TCM status is monitored or terminated it could be correlated to an alarm or trigger a protection switch.

Figure 4:
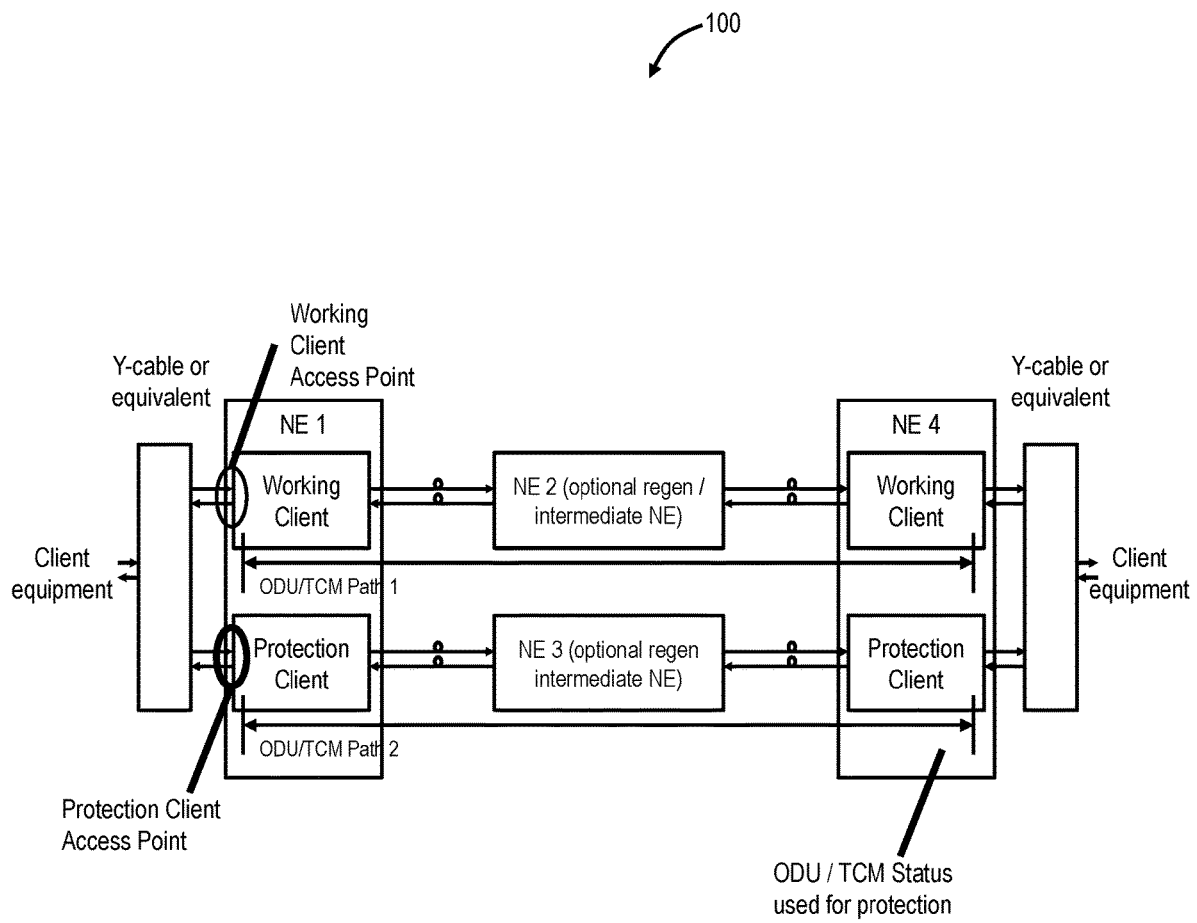
FIG. 4 is a network diagram of a network illustrating end to end physical layer protection.
Figure 5:
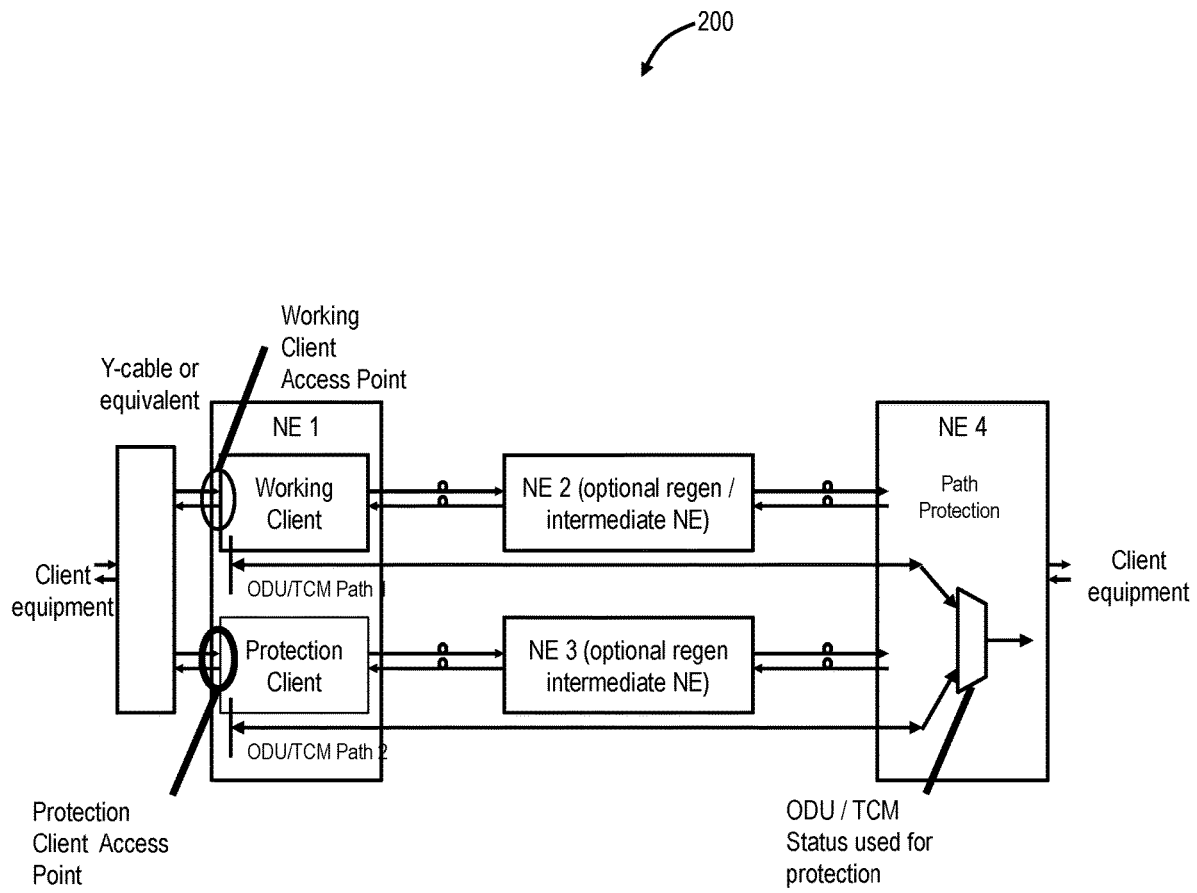
FIG. 5 is a network diagram of a network illustrating physical layer protection to path protection.

FIG. 4 is a network diagram of a network 100 illustrating end to end physical layer protection. FIG. 5 is a network diagram of a network 200 illustrating physical layer protection to path protection. The ingress client signal from the client equipment is optically split before entering the transport equipment. Therefore there are two independent client sources and two independent ODU paths—ODU Path 1 and ODU Path 2. There may be any of these faults present at either the Working Client Access Point or the Protection Client Access Point due to equipment faults, administrative states or issues with the Y-cable equipment or fibers between it and NE 1. The client with the fault would assert the appropriate client status bit to be able to trigger a path-based protection switch at the far end. These faults may traverse other network elements through the network, depicted as optional NEs 2 and 3, operating either as regens or simply as OTN equipment passing the ODU/TCM path through transparently.

In FIG. 4, the protection mechanism at the far-end (NE 4) is another Y-cable or equivalent. The protection mechanism could be an active optical coupler which simply requires a failed path to trigger the turning of its laser off towards the coupler, triggering an optical switch. It could also be a passive coupler which requires coordination between the two client ports such that both ports never have their laser on at the same time.

In FIG. 5, the protection mechanism at the far-end (NE 4) is a path-based protection scheme which is using either the ODU Path (SNC/Ne) or TCM Path (SNC/S or SNC/Ns) status to trigger a path protection switch.

Example Network Element/Node

Figure 6:
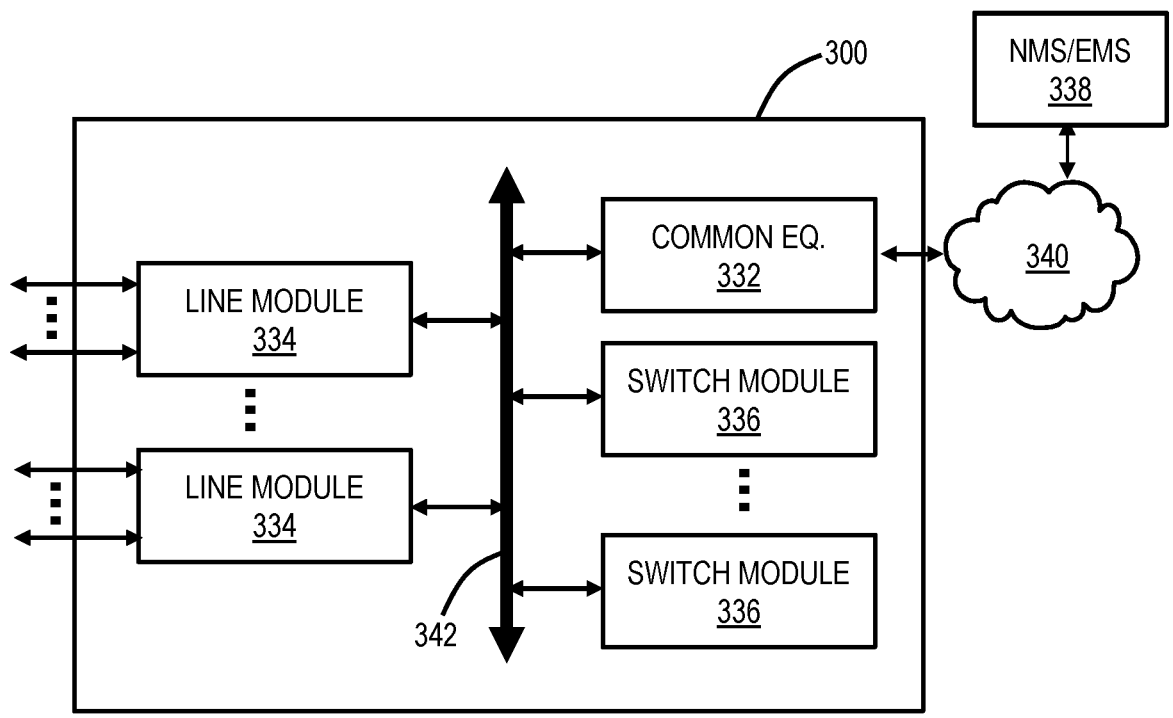
FIG. 6 is a block diagram of a network element for use with the systems and methods described herein.

FIG. 6 is a block diagram of a network element 300 for use with the systems and methods described herein. In an embodiment, the network element 300 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the network element 300 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the network element 300 can be a system with ingress and egress digital and/or optical signals and switching of channels, timeslots, tributary units, etc. Also, the network element 300 can be a system with ingress and egress of optical signals and switching/routing of wavelengths. Of course, the network element 300 can combine both digital signals and optical signals. While the network element 300 is generally shown as an optical network element, the systems and methods contemplated for use with any distributed system.

The network element 300 can include common equipment 332, one or more line modules 334, and one or more switch modules 336. The common equipment 332 can include power; a control module; Operations, Administration, Maintenance, and Provisioning (OAM&P) access; user interface ports; and the like. The common equipment 332 can connect to a management system 338 through a data communication network 340. The management system 338 can include a Network Management System (NMS), Element Management System (EMS), or the like. Additionally, the common equipment 332 can include a control plane processor, such as a controller 350 illustrated in FIG. 7. The network element 300 can include an interface 342 for communicatively coupling the common equipment 332, the line modules 334, and the switch modules 336 to one another. For example, the interface 342 can be a backplane, midplane, a bus, optical or electrical connectors, or the like. The line modules 334 are configured to provide ingress and egress to the switch modules 336 and to external connections on the links to/from the network element 300. In an embodiment, the line modules 334 can form ingress and egress switches with the switch modules 336 as center stage switches for a three-stage switch, e.g., a three-stage Clos switch. Other configurations and/or architectures are also contemplated.

The line modules 334 can include optical transceivers. Further, the line modules 334 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between as well as future higher rates. The line modules 334 can include wavelength division multiplexing interfaces, short reach interfaces, and the like, and can connect to other line modules 334 on remote network elements, end clients, edge routers, and the like, e.g., forming connections on links in a network. From a logical perspective, the line modules 334 provide ingress and egress ports to the network element 300, and each line module 334 can include one or more physical ports. The switch modules 336 are configured to switch channels, timeslots, tributary units, packets, etc. between the line modules 334. For example, the switch modules 336 can provide wavelength granularity (Layer 0 switching); OTN granularity, Ethernet granularity, and the like. Specifically, the switch modules 336 can include Time Division Multiplexed (TDM) (i.e., circuit switching) and/or packet switching engines. The switch modules 336 can include redundancy as well, such as 1:1, 1:N, etc.

Those of ordinary skill in the art will recognize the network element 300 can include other components which are omitted for illustration purposes, and that the systems and methods described herein are contemplated for use with a plurality of different network elements with the network element 300 presented as an example of a type of network element. For example, in another embodiment, the network element 300 may not include the switch modules 336, but rather have the corresponding functionality in the line modules 334 (or some equivalent) in a distributed fashion. For the network element 300, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the network element 300 is merely presented as one example of a network element for the systems and methods described herein. In another embodiment, there can be a transponder-based architecture where multiple line modules and an optional switch module are contained in a single circuit pack or rack-mounted unit.

Controller

Figure 7:
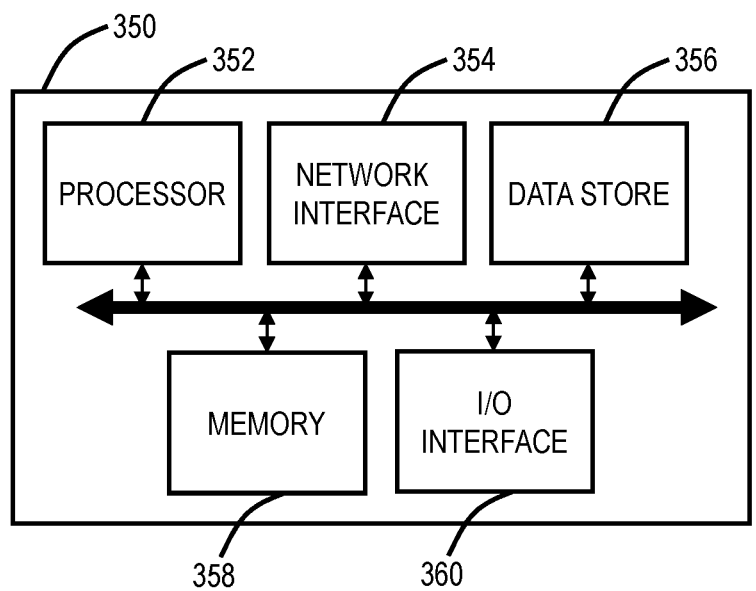

FIG. 7 is a block diagram of a controller 350 for the network element 300 or the like. The controller 350 can be part of the common equipment, such as common equipment 332 in the network element 300, part of one of the modules 334, 336, a stand-alone device communicatively coupled to the network element 300 via the DCN 340, etc. The controller 350 can include a processor 352 which is a hardware device for executing software instructions. The processor 352 can be any custom made or commercially available processor, a central processing unit (CPU), an auxiliary processor among several processors associated with the controller 350, a semiconductor-based microprocessor (in the form of a microchip or chip set), or generally any device for executing software instructions. When the controller 350 is in operation, the processor 352 is configured to execute software stored within the memory, to communicate data to and from memory 358, and to generally control operations of the controller 350 pursuant to the software instructions. The controller 350 can also include a network interface 354, a data store 356, memory 358, an I/O interface 360, and the like, all of which are communicatively coupled to one another and to the processor 352.

The network interface 354 can be used to enable the controller 350 to communicate on the DCN 340 or another network. The network interface 354 can include, for example, an Ethernet card (e.g., 10BaseT, Fast Ethernet, Gigabit Ethernet) or a wireless local area network (WLAN) card (e.g., 802.11). The network interface 354 can include address, control, and/or data connections to enable appropriate communications on the network. The data store 356 can be used to store data, such as control plane information, provisioning data, OAM&P data, etc. The data store 356 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 356 can incorporate electronic, magnetic, optical, and/or other types of storage media. The memory 358 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 358 may incorporate electronic, magnetic, optical, and/or other types of storage media. Note that the memory 358 can have a distributed architecture, where various components are situated remotely from one another but may be accessed by the processor 352. The I/O interface 360 includes components for the controller 350 to communicate with other devices.

Process

Figure 8:
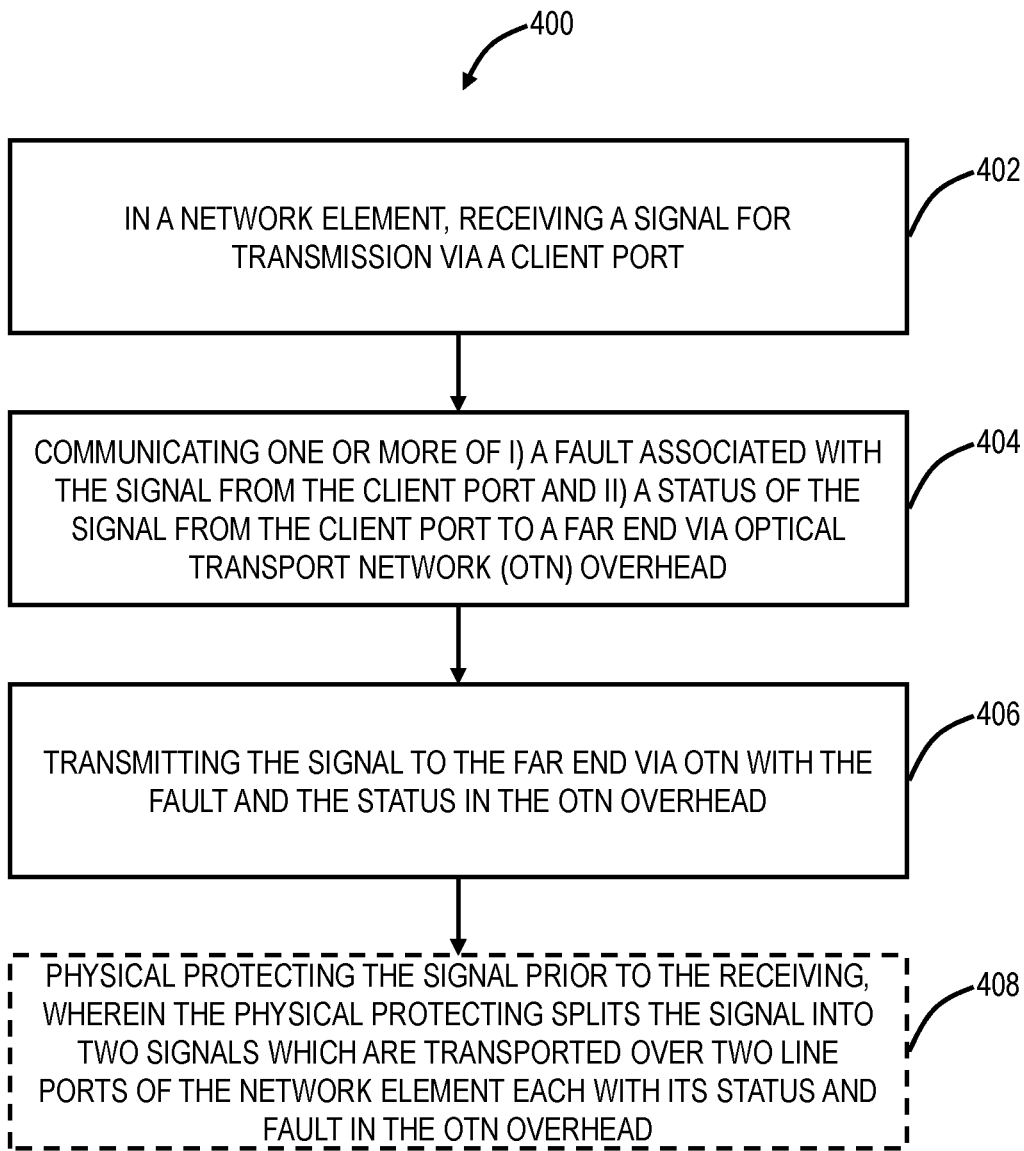
FIG. 8 is a flowchart of an OTN process for communicating faults and/or status in OTN overhead.

FIG. 8 is a flowchart of an OTN process 400 for communicating faults and/or status in OTN overhead. The OTN process 400 includes, in a network element, receiving a signal for transmission via a client port (step 402); communicating one or more of i) a fault associated with the signal from the client port and ii) a status of the signal from the client port to a far end via Optical Transport Network (OTN) overhead (step 404); transmitting the signal to the far end via OTN with the fault and the status in the OTN overhead (step 406). Note, while described herein together, the use of status and fault can be one or the other as described above. The communicating of the fault can utilize one or more Tandem Connection Monitoring (TCM) layers in the OTN overhead. The one or more TCM layers can have an Alarm Indication Signal (AIS) inserted therein responsive to the fault. The communicating of the status can utilize one or more of Optical Data Unit (ODU) Performance Monitoring (PM) and one or more Tandem Connection Monitoring (TCM) layers. The OTN process 400 can include physical protecting the signal prior to the receiving, wherein the physical protecting splits the signal into two signals which are transported over two line ports of the network element each with its status and fault in the OTN overhead (step 408).

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network element comprising:
   a client port configured to receive a signal for transmission;
   a line port configured to transmit the signal to a far end via Optical Transport Network (OTN); and
   circuitry configured to communicate one or more of a fault and a status associated with the signal based on the client port to the far end via OTN overhead,
   wherein the fault is communicated via one or more Tandem Connection Monitoring (TCM) layers in the OTN overhead with a pattern based on a type of the fault.

2. The network element of claim 1, wherein the one or more TCM layers are a plurality of TCM layers for monitoring of the signal at multiple points in a network.

3. The network element of claim 1, wherein the signal is an OTN signal utilizing a first set of one or more of the TCM layers, and wherein a second set of one or more TCM layers for the fault are utilized different from the first set.

4. The network element of claim 1, wherein the one or more TCM layers have an Alarm Indication Signal (AIS) inserted therein responsive to the fault.

5. The network element of claim 1, wherein the status is inserted in one or more of Optical Data Unit (ODU) Performance Monitoring (PM) and one or more of the TCM layers.

6. The network element of claim 5, wherein the status is in one or more unused bytes in the OTN overhead with each position in the unused bytes utilized to convey a different status.

7. The network element of claim 5, wherein the status is one or more of degraded physical signal, client admin down, equipment fail, client signal fail, and client signal degrade.

8. The network element of claim 1, further comprising physical protection between the client port and associated client equipment, wherein the physical protection splits the signal into two signals which are transported over the line port and a second line port.

9. The network element of claim 8, wherein the far end is configured to select the two signals from the line port and the second line port based on one or more of the status and the fault.

10. A network comprising:
    a network element A;
    a network element Z; and
    a plurality of network elements interconnecting the network element A and the network element Z;
    wherein a client service is configured between the network element A and the network element Z on two different paths and using Optical Transport Network (OTN),
    wherein the network element A utilizes OTN overhead to communicate one or more of i) a fault associated with the client service and ii) a status of the client service on any of the two different paths, and
    wherein the network element Z utilizes any of the fault and the status to select one of the two different paths, and
    wherein the fault is communicated via one or more Tandem Connection Monitoring (TCM) layers in the OTN overhead with a pattern based on a type of the fault.

11. The network of claim 10, wherein the status is communicated via one or more of i) Optical Data Unit (ODU) Performance Monitoring (PM) and ii) one or more of the TCM layers.

12. A method comprising:
    in a network element, receiving a signal for transmission via a client port;
    communicating one or more of i) a fault associated with the signal from the client port and ii) a status of the signal from the client port to a far end via Optical Transport Network (OTN) overhead; and
    transmitting the signal to the far end via OTN with the fault and the status in the OTN overhead,
    wherein the fault is communicated via one or more Tandem Connection Monitoring (TCM) layers in the OTN overhead with a pattern based on a type of the fault.

13. The method of claim 12, wherein the one or more TCM layers have an Alarm Indication Signal (AIS) inserted therein responsive to the fault.

14. The method of claim 12, wherein the one or more TCM layers are a plurality of TCM layers for monitoring of the signal at multiple points in a network.

15. The method of claim 12, wherein the communicating the status utilizes one or more of i) Optical Data Unit (ODU) Performance Monitoring (PM) and ii) one or more of the TCM layers.

16. The method of claim 12, further comprising
    physical protecting the signal prior to the receiving, wherein the physical protecting splits the signal into two signals which are transported over two line ports of the network element each with its status and fault in the OTN overhead.

* * * * *